United States Patent [19]
Takeuchi

[11] Patent Number: 5,971,719
[45] Date of Patent: Oct. 26, 1999

[54] HYDRAULIC CONTROL DEVICE OF AUTOMATIC TRANSMISSION

[75] Inventor: Masahiro Takeuchi, Fuji, Japan

[73] Assignee: Jatco Corporation, Japan

[21] Appl. No.: 09/087,321

[22] Filed: May 29, 1998

[30]    Foreign Application Priority Data

Jun. 4, 1997 [JP] Japan ................................ 9-146223

[51] Int. Cl.[6] .................................................. F04B 49/08
[52] U.S. Cl. .......................... 417/307; 417/309; 477/156
[58] Field of Search .................... 477/156, 157, 477/158, 163, 164, 61; 417/218, 220, 307, 309

[56]              References Cited

U.S. PATENT DOCUMENTS

| | | | |
|---|---|---|---|
| 3,692,432 | 9/1972 | Liang et al. ............................. | 417/307 |
| 4,632,638 | 12/1986 | Shibayama et al. ..................... | 417/220 |
| 4,679,988 | 7/1987 | Leorat et al. ........................... | 417/218 |
| 4,693,081 | 9/1987 | Nakamura et al. ...................... | 417/220 |
| 5,081,839 | 1/1992 | McWilliams ............................. | 417/307 |
| 5,292,234 | 3/1994 | Ling ....................................... | 417/309 |

*Primary Examiner*—Willis R. Wolfe
*Attorney, Agent, or Firm*—Rossi & Associates

[57]              ABSTRACT

A hydraulic control device of an automatic transmission is provided wherein three-stage valve bodies are superposed on and fixed to each other with partition plates interposed therebetween, and a pressure regulator valve is mounted in a middle-stage valve body out of the three valve bodies. An inlet oil path that extends from an oil strainer to an inlet port of an oil pump is formed in a lower portion of the valve body. A drain port of the pressure regulator valve communicates with the inlet oil path leading to the inlet port, through a drain hole formed through the partition plate between the middle-stage and lower-stage valve bodies, and a drain hole formed through the low-stage valve body. In this arrangement, the oil drained from the pressure regulator valve is led to the inlet port without passing through the oil strainer, assuring an increased degree of freedom in selecting the position of the pressure regulator valve.

4 Claims, 7 Drawing Sheets

HYDRAULIC CONTROL DEVICE OF AUTOMATIC TRANSMISSION

BACKGROUND OF THE INVENTION

1. Field of the Invention

The present invention relates to a hydraulic control device of an automatic transmission, wherein a pressure regulator valve is used for regulating a pressure of oil delivered from an oil pump, into a line pressure.

2. Description of the Prior Art

A known example of hydraulic control device of an automatic transmission is disclosed in Japanese laid-open Patent Publication No. 57-40147. This hydraulic control device was developed to solve a problem that air is sucked into an oil strainer when the oil level in an oil reservoir is lowered due to a low oil temperature, and the air is mixed into the oil flowing into an inlet oil path. In the hydraulic control device disclosed in the above-identified publication, a drain port of a pressure regulator valve communicates with a portion of an inlet oil path which is located downstream of the oil strainer, so that the oil drained from the pressure regulator valve is directly led to an inlet port of an oil pump without passing through the oil strainer.

In the known device, however, the oil discharged from the drain port of the pressure regulator valve flows in a direction which is reverse to a direction in which the oil flows from an opening of the oil strainer toward the inlet oil path, resulting in a collision of flows of the oil.

Figure 7:
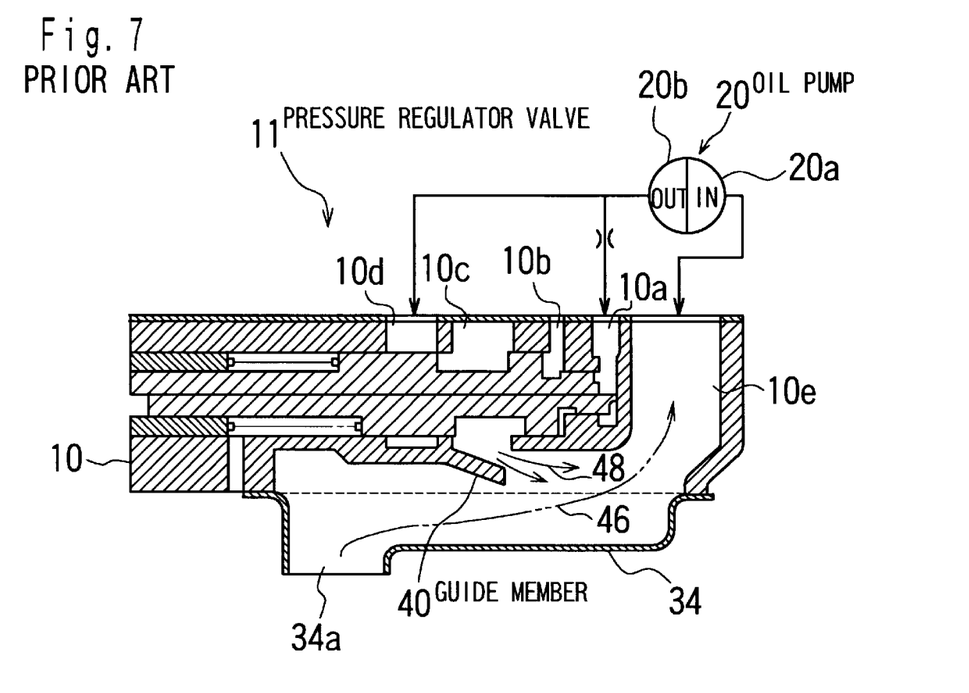
FIG. 7 is a cross-sectional view showing a known example of hydraulic control device of an automatic transmission.

To solve the above problem, it has been proposed in Japanese laid-open Patent Publication No. 6-272762 to provide a baffle member 40 as shown in FIG. 7, so that the direction 48 of flow of the oil discharged from a drain port 10c of a pressure regulator valve 11 coincides with the direction 46 of the oil flowing from an oil strainer 34 toward an inlet port 20a.

In the hydraulic control device of the automatic transmission disclosed in Japanese laid-open Patent Publication No. 6-272762 as identified above, however, the pressure regulator valve 11 having the drain port 10c, oil strainer 34 having an opening 34a, and the inlet oil path 10e that communicates with the inlet port 20a of the oil pump are provided in the same valve body 10. Accordingly, the position at which the pressure regulator valve 11 can be installed is limited to a region located between the opening 34a of the oil strainer and the inlet oil path 10e.

Figure 8:
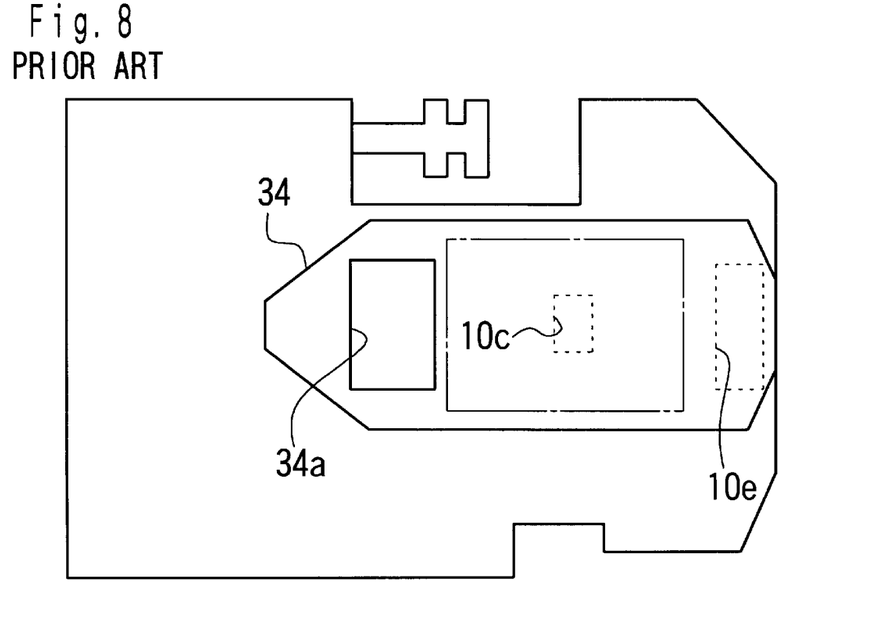
FIG. 8 is an explanatory view showing a region in which a pressure regulator valve of the known hydraulic control device can be provided.

As shown in FIG. 8, the drain port 10c of the pressure regulator valve 11 must be formed at a position covered by the oil strainer 34, namely, between the opening 34a of the strainer and the inlet oil path 10e. Since the pressure regulator valve and the oil strainer are formed in the same valve body, the positions of other ports of the pressure regulator valve are determined to be within a region (delimited by a one-dot chain line) covered by the strainer once the position of the drain port 10c is determined.

When a large number of valves are mounted in the valve body, therefore, there is a limit to the layout of the valves since the position of the pressure regulator valve cannot be freely varied. Also, once the position of the drain port is determined, the shape of the oil strainer cannot be freely selected or determined.

SUMMARY OF THE INVENTION

It is therefore an object of the present invention to provide a hydraulic control device of an automatic transmission in which a drain oil discharged from a pressure regulator valve is directly led to an inlet port of an oil pump without passing through an oil strainer, wherein there is no limit to the position where the pressure regulator valve is mounted, assuring an increased degree of freedom in layout of the valves.

To accomplish the above object, the present invention provides a hydraulic control device of an automatic transmission, comprising: an oil pump having an inlet port; an oil strainer which removes foreign matters contained in oil that is introduced through an opening thereof and directed toward the inlet port of the oil pump through an inlet oil path; a valve body provided with a plurality of valves for controlling a hydraulic pressure of the automatic transmission; and a pressure regulator valve which regulates a pressure of oil delivered from the oil pump into a line pressure, the pressure regulating valve having a drain port which communicates with a portion of the inlet oil path which is located downstream of the oil strainer, wherein the valve body comprises a plurality of valve bodies that are superposed on and fixed to each other, and at least one partition plate interposed between adjacent ones of the plurality of valve bodies, wherein the pressure regulator valve is provided in one of the plurality of valve bodies other than a lowest-stage valve body, and wherein the drain port of the pressure regulator valve communicates with the inlet oil path leading to the inlet port, through a drain hole formed through the at least one partition plate, and a drain hole formed through the lowest-stage valve body.

In the hydraulic control device constructed as described above, the pressure regulator valve is provided in one of the valve bodies that are superposed on and fixed to each other with the partition plate(s) interposed therebetween, which one of the valve bodies is other than the lowest-stage valve body. The drain port of the pressure regulator valve communicates with the inlet oil path leading to the input port of the oil pump, through the drain hole formed through the partition plate(s), and the drain hole formed through the lowest-stage valve body. Accordingly, the limit to the position of the pressure regulator valve is eliminated, thus assuring an increased degree of freedom in the layout of the valves.

The drain port of the pressure regulator valve may be formed in an outer peripheral portion of one of the plurality of valve bodies in which the pressure regulator valve is mounted, so that the drain port is located at a position adjacent to the inlet oil path leading to the oil pump.

Preferably, the above-indicated at least one partition plate includes a drain hole and an inlet oil path hole which are formed adjacent to each other to communicate with the drain port and the inlet oil path that are located adjacent to each other, and the lowest-stage valve body is provided with an air suction preventive rib that is located between the drain hole and the inlet oil path hole.

When the drain port of the pressure regulator valve is formed in the outer peripheral portion of the valve body, to be located adjacent to the inlet oil path leading to the oil pump, a main hydraulic circuit in the valve body that is lower than the body in which the pressure regulator valve is mounted is not interrupted or disconnected, and therefore oil paths in the hydraulic circuit can be set or designed with improved efficiency. In addition, a guide member (which will be described later) having small height and length may be provided on the lowest-stage valve body.

With the air suction preventive rib provided between the drain hole and inlet oil hole of the lowest-stage body, the drained oil can be directly directed toward the inlet oil path, without causing air suction into the oil pump.

In another preferred form of the hydraulic control device of the automatic transmission as described above, the lowest-stage body is provided with a guide member so that the direction of flow of an oil discharged from the drain port of the pressure regulator valve through the drain hole of the lowest-stage valve body coincides with the direction of oil flowing from the oil strainer toward the inlet oil path. With the lowest-stage valve body provided with the guide member, the resistance of the oil sucked into the oil pump can be reduced, and the efficiency of suction of the oil into the oil pump can be increased.

BRIEF DESCRIPTION OF THE DRAWINGS

This invention will be described in greater detail with reference to preferred embodiments thereof and the accompanying drawings, wherein.

DETAILED DESCRIPTION OF THE PREFERRED EMBODIMENT

Figure 1:
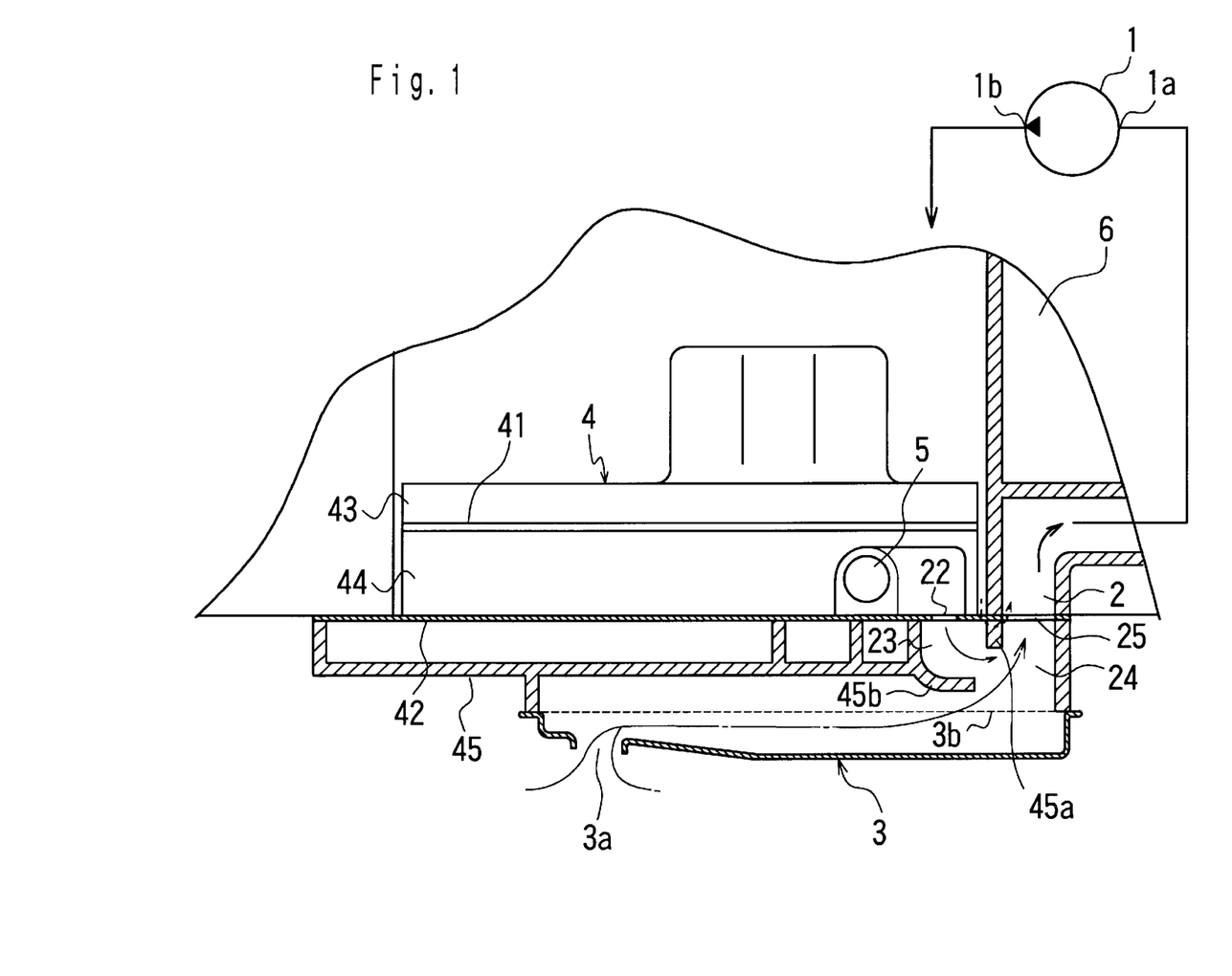
FIG. 1 is a cross-sectional view showing a hydraulic control device of an automatic transmission according to one embodiment of the present invention.

Referring first to FIG. 1, a hydraulic control device of an automatic transmission according to one embodiment of the present invention includes an oil pump 1, inlet oil path 2, oil strainer 3, valve body 4, and a pressure regulator valve 5.

The oil pump 1 is driven by the engine which is not illustrated in FIG. 1, and has an inlet port 1a that communicates with the inlet oil path 2, and a delivery port 1b that communicates with a pump delivery pressure port of the pressure regulator valve 5.

The inlet oil path 2 is formed in a transmission case 6. Through this inlet oil path 2, an oil stored in a reservoir is led to the inlet port 1a of the oil pump 1 through the oil strainer 3, and a drain oil discharged from the pressure regulator valve 5 is led to the inlet port 1a of the oil pump 1.

Figure 2:
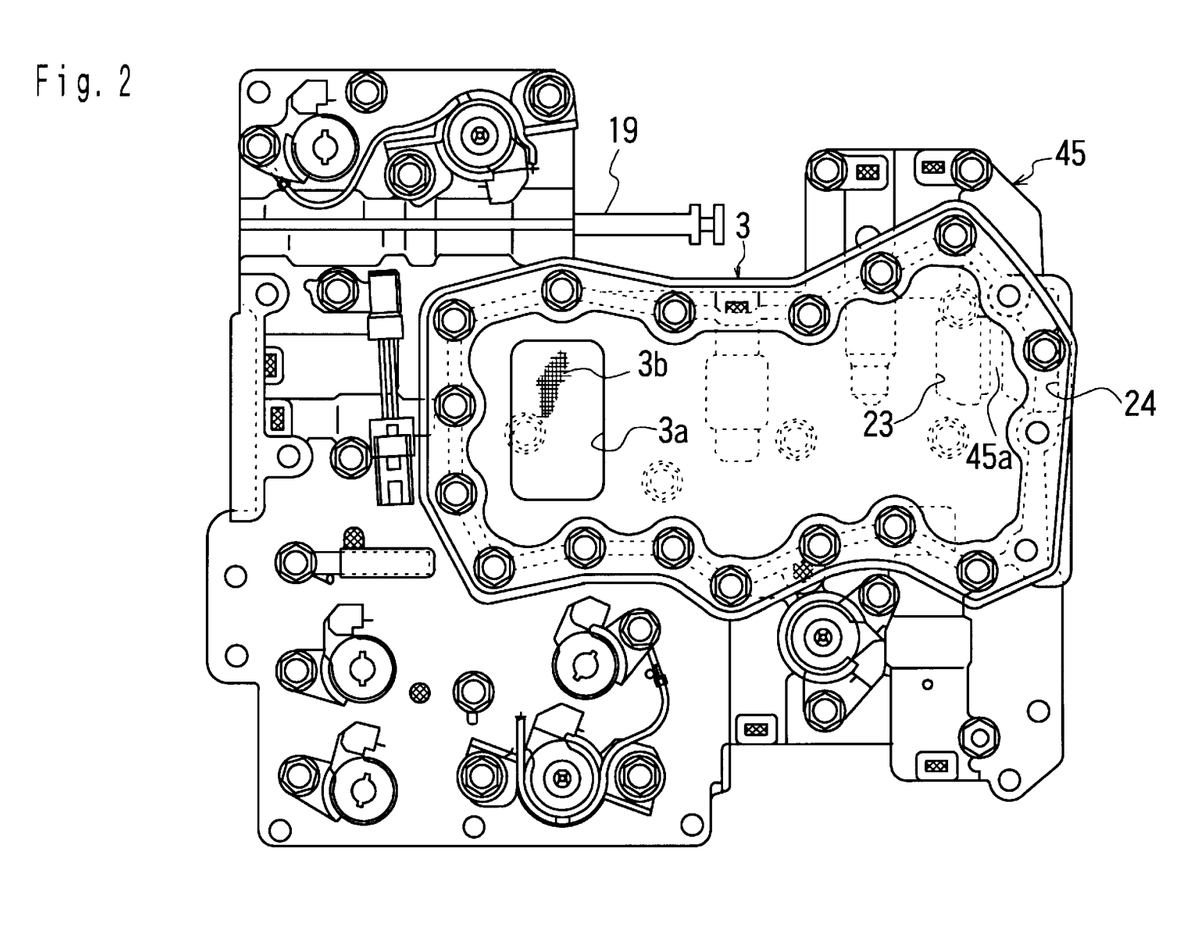
FIG. 2 is a bottom plan view showing a lower-stage valve body provided with an oil strainer in the embodiment of FIG. 1.

The oil strainer 3 is fixed to a bottom portion of the valve body 4 (a lower-stage valve body 45), as shown in FIG. 2, and includes a filter 3b for removing foreign matters contained in the oil that flows from an opening 3a of the strainer 3 to the inlet port 1a of the oil pump 1 through the inlet oil path 2.

The valve body 4 is fixed to the transmission case 6, and includes various types of valves for controlling the hydraulic pressure of the automatic transmission. This valve body 4 includes an upper-stage valve body 43, a middle-stage valve body 44, and a lower-stage valve body 45, which are superposed on and fixed to each other with a first partition plate 41 interposed between the upper-stage and middle-stage valve bodies 43,44, and a second partition plate 42 interposed between the middle-stage and lower-stage valve bodies 44, 45.

Figure 3:
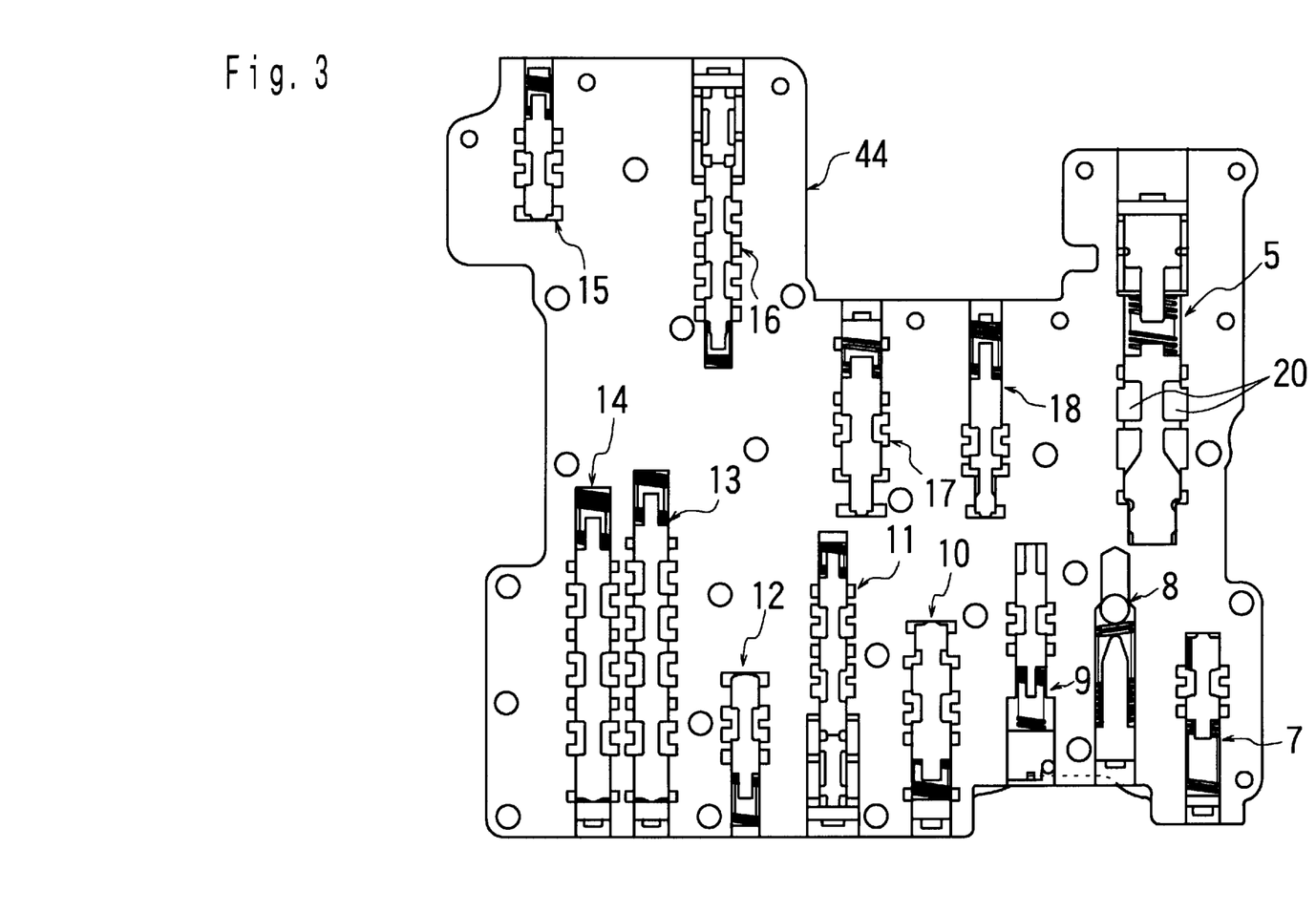
FIG. 3 is a cross-sectional view of a middle-stage valve body showing the layout of valves in the embodiment of FIG. 1.

The upper-stage valve body 43 is provided with an accumulators(s), oil paths and others, as shown in FIG. 1. The middle-stage valve body 44 is provided with the pressure regulator valve 5, torque converter regulator valve 7, torque converter one-way valve 8, pressure modifier valve 9, accumulator control valve A 10, low-clutch timing valve A 11, low-clutch timing valve B 12, shift valve B 13, shift valve A 14, 2–4 brake timing valve B 15, 2–4 brake timing valve A 16, accumulator control valve B 17, and a reverse inhibitor valve 18, which are laid out or arranged as shown in FIG. 3. The lower-stage valve body 45 is provided with a manual valve 19, as shown in FIG. 2.

The pressure regulator valve 5 serves to regulate the pressure of oil delivered from the oil pump 1 into a suitable line pressure, and is formed in the middle-stage valve body 44 out of the three-stage valve bodies 43, 44, 45.

Figure 4:
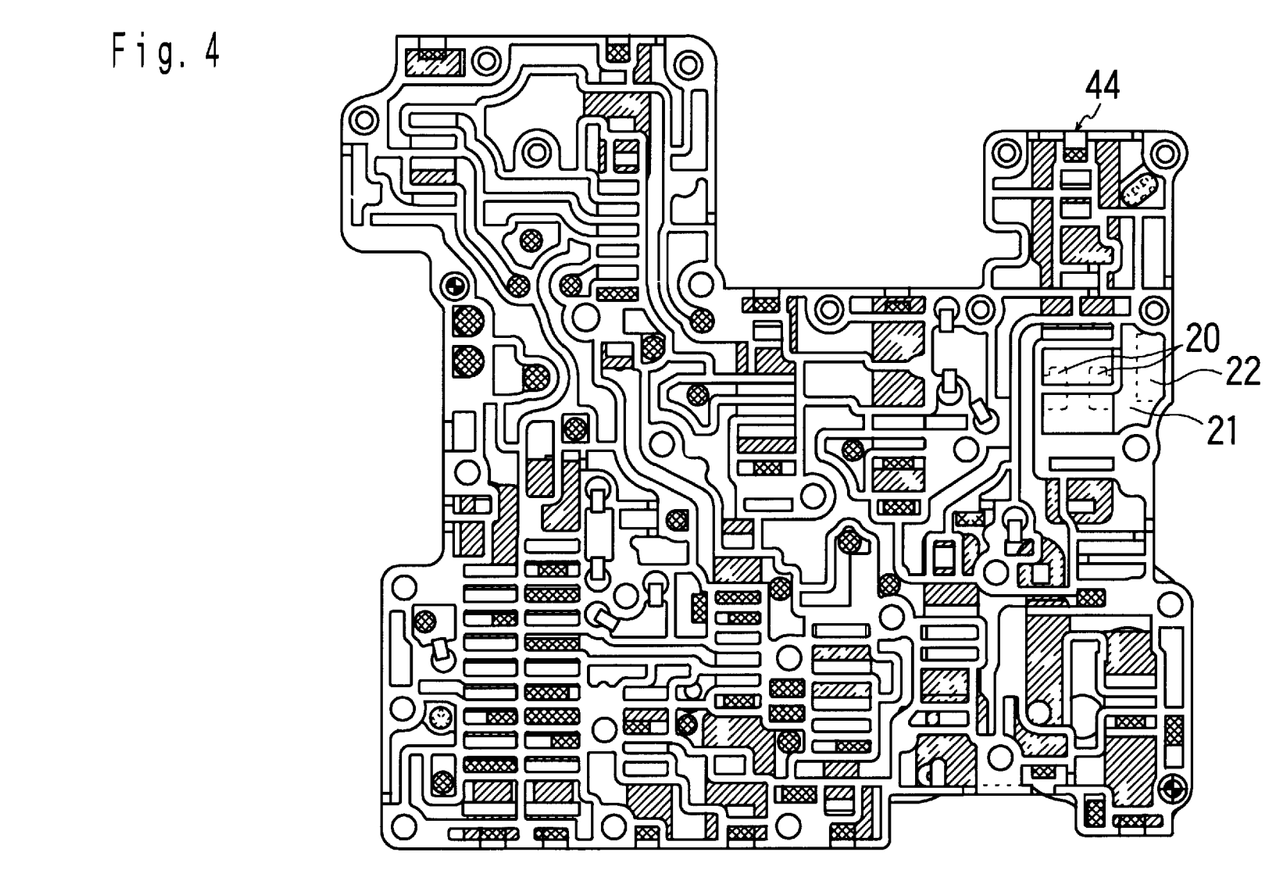
FIG. 4 is a bottom plan view of the middle-stage valve body, showing a drain port of a pressure regulator valve of the embodiment of FIG. 1.

A drain port 20 of the pressure regulator valve 5 is provided at an outer peripheral portion of the middle-stage valve body 44 in which the pressure regulator valve 5 is mounted, and is thus located at a position adjacent to the inlet oil path 2 leading to the oil pump 1. The middle-stage valve body 44 is formed with a drain oil path 21 which communicates with the drain port 20 and a drain hole 22 formed through the second partition plate 42.

Figure 5:
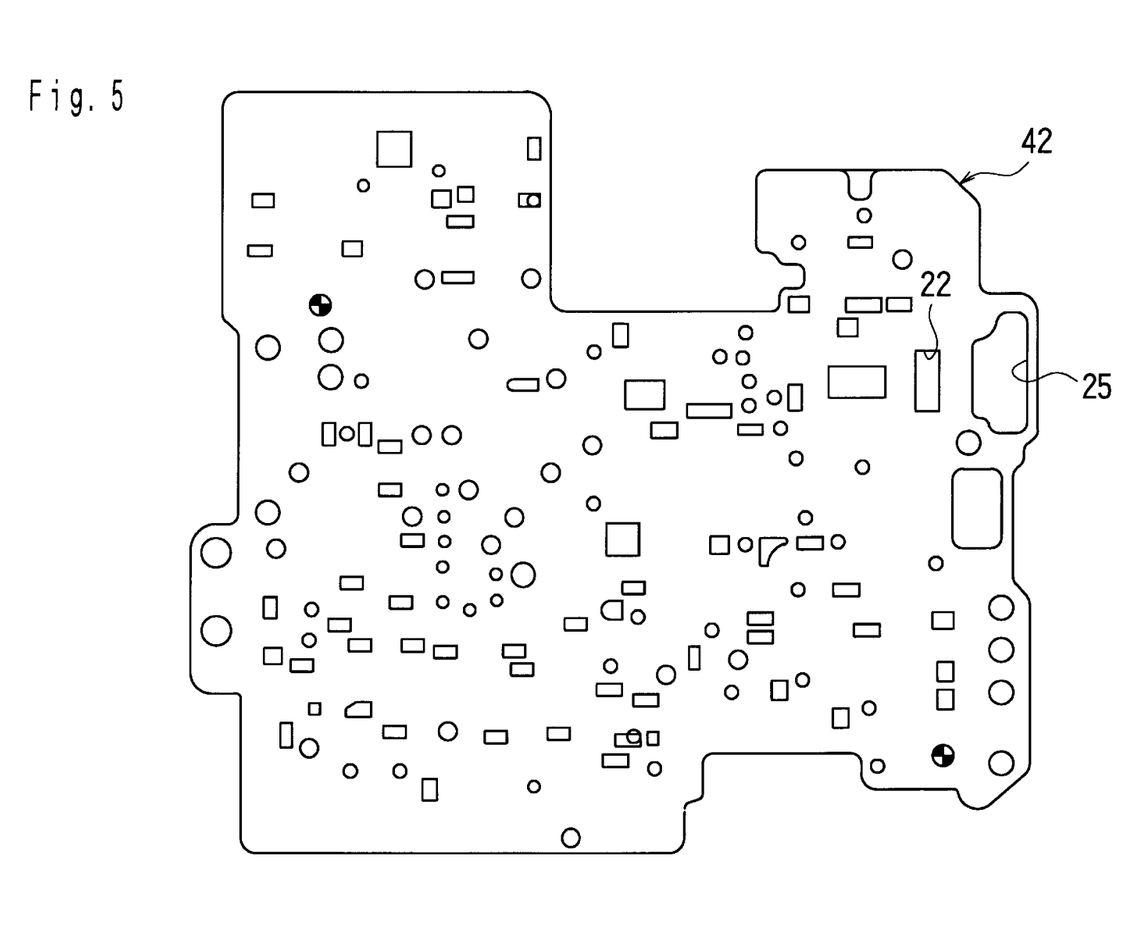
FIG. 5 is a plan view showing a second partition plate having a drain hole and an inlet oil path hole in the embodiment of FIG. 1.
Figure 6:
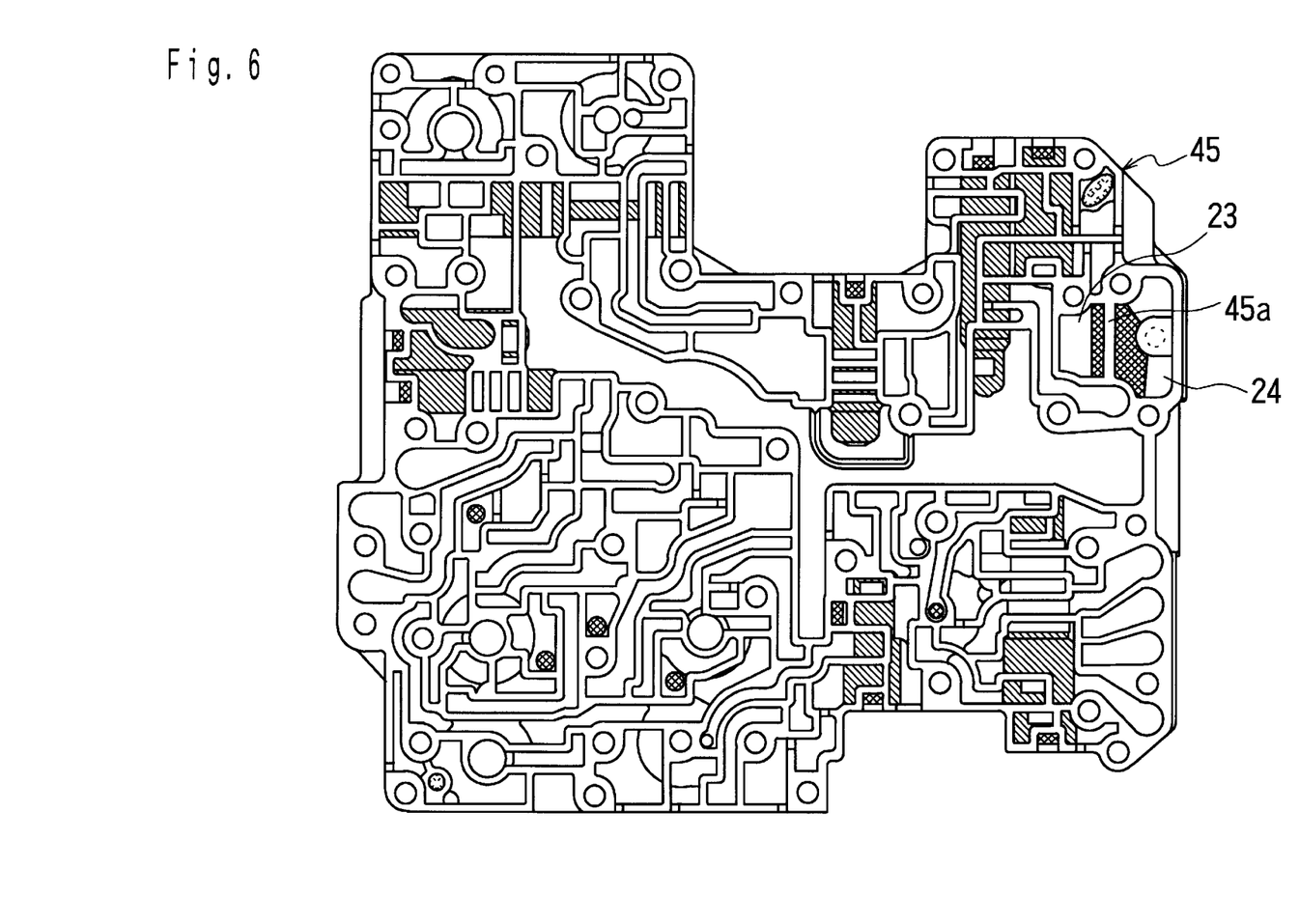
FIG. 6 is a plan view showing a lower-stage valve body through which a drain hole and an inlet oil path are formed.

With the drain port 20 and the inlet oil path 2 thus located adjacent to each other, the drain hole 22 and an inlet oil path hole 25 are formed through adjacent portions of the second partition plate 42, as shown in FIG. 1 and FIG. 5, and a drain hole 23 and an inlet oil path hole 24 are formed at adjacent portions of the lower-stage valve body 45, as shown in FIG. 1 and FIG. 6. Namely, the drain port 20 of the pressure regulator valve 5 communicates with the inlet oil path 2 leading to the inlet port 1a, through the drain oil path 21 of the middle-stage valve body 44, drain hole 22 of the second partition plate 42, drain hole 23 of the lower-stage valve body 45, inlet oil path hole 24 of the lower-stage valve body 45, and the inlet oil path hole 25 of the second partition plate 42.

As shown in FIG. 1, an air suction preventive rib 45a is formed as an integral part of the lower-stage valve body 45, such that the rib 45a is located between the drain hole 22 and the inlet oil path hole 25. A guide portion 45b is also formed as an integral part of the lower-stage valve body 45, so that the direction of flow of the oil discharged from the drain port 20 of the pressure regulator valve 5 through the drain hole 23 of the lower-stage valve body 45 coincides with the direction of the oil that flows from the oil strainer 3 toward the inlet oil path 2.

Next, the operations and effects of the present embodiment will be explained.

Line Pressure Regulating Operation

When the oil pump 1 is driven by the engine, the oil stored in the reservoir is led to the inlet port 1a of the oil pump 1, through the oil strainer 3 and inlet oil path 2, such that foreign matters contained in the oil are removed by the oil strainer 3.

In the meantime, the pump delivery oil is supplied from the delivery port 1b of the oil pump 1 to the pressure regulator valve 5, so that the pressure regulator valve 5 regulates the pressure of the oil into the line pressure by draining a part of the pump delivery oil. The drain oil discharged from the pressure regulator valve 5 is also led to the inlet port 1*a* of the oil pump 1, through the drain port 20, drain oil path 21, drain hole 22, drain hole 23, inlet oil path hole 24, inlet oil path hole 25, and the inlet oil path 2.

Namely, the oil stored in the reservoir is led to the inlet port 1*a* of the oil pump 1 through the oil strainer 3, while the drain oil from the pressure regulator valve 5 is led to the inlet port 1*a* of the oil pump 1 without passing through the oil strainer 3.

In a conventional hydraulic control device in which the oil drained from the pressure regulator valve is also directly returned to the reservoir, air may be sucked into the oil strainer when the oil level in the oil reservoir is lowered due to a low temperature of the oil, and the air may be undesirably mixed or introduced into the oil flowing through the oil pump.

In the present embodiment, on the other hand, the oil drained from the pressure regulator valve 5 is led to the inlet port 1*a* of the oil pump 1 without passing through the oil strainer 3. Thus, even if the oil level in the oil reservoir is lowered due to a low oil temperature, for example, air is prevented from being mixed into the oil since the drain oil from the pressure regulator valve 5 is directly led to the inlet port 1*a* of the oil pump 1.

Degree of Freedom in the Valve Layout

The pressure regulator valve 5 is mounted or installed in the middle-stage valve body 44 (as a body other than the lower-stage valve body 45), out of the three-stage valve bodies 43, 44,45. With this arrangement, the pressure regulator valve 5 may be mounted at a position other than that of the above embodiment, by using a pull-in drain circuit (drain oil path 21) for communicating the drain port 20 of the pressure regulator valve 5 with the drain hole 22 of the second partition plate 42.

Although the position of the pressure regulator valve is limited to a particular position in the conventional hydraulic control device wherein the pressure regulator valve and the drain circuit leading from the drain port to the inlet oil path are both provided in the same valve body, such a limit in the position of the pressure regulator valve is eliminated according to the present invention.

Consequently, when a large number of valves are formed in the valve body as shown in FIG. 3, the position of the pressure regulator valve 5 can be freely determined, assuring a high degree of freedom or increased choice in the layout of these valves.

The position of the drain port 20 of the pressure regulator valve 5 may also be freely determined, thus assuring an increased degree of freedom or choice in determining the shape of the oil strainer 3.

Determination of Position of Drain Port

If the drain port of the pressure regulator valve is positioned in a central portion of the middle-stage valve body in which the pressure regulator valve is mounted, and is extended to a position adjacent to the inlet oil path of the oil pump through a drain circuit or drain hole formed through the lower-stage valve body, for example, the main hydraulic circuit in the lower-stage valve body may be interrupted or disconnected, making it impossible to set or design paths of the hydraulic circuit with high efficiency. In addition, where a guide member is to be provided in the drain path, a guide plate having relatively large height and length must be used as the guide member.

In the above-described embodiment of the present invention, on the other hand, the drain port 20 of the pressure regulator valve 5 is provided at the outer peripheral portion of the middle-stage valve body 44 in which the pressure regulator valve 5 is mounted, and thus located at a position adjacent to the inlet oil path 2 leading to the oil pump 1. Accordingly, the main hydraulic circuit in the lower-stage valve body 45 is not interrupted or disconnected, and oil paths of the hydraulic circuit can be set or designed with high efficiency. Where a guide member is to be provided in the drain path, the guide portion 45*b* having relatively small height and length may be used as the guide member.

Prevention of Suction of Air

When the drain port 20 of the pressure regulator valve 5 and the inlet oil path 2 leading to the oil pump 1 are formed at adjacent positions, and the drained oil is directly directed toward the inlet oil path 2, air may be sucked into the inlet oil path 2 through a clearance between the transmission case 6 and the second partition plate 42, due to a negative pressure of the oil pump 1, as shown by a dotted arrow line in FIG. 1.

In view of the above problem, the air suction preventive rib 45*a* is formed as an integral part of the lower-stage valve body 45, at a position between the drain hole 22 and inlet oil path hole 25 formed through the second partition plate 42, and the surface pressure between the transmission case 6 and second partition plate 42 is increased to thereby eliminate the clearance. Thus, the air suction preventive rib 45*a* serves to prevent suction of air into the inlet oil path 2 even if the drained oil is directly directed toward the inlet oil path 2.

Since the drain hole 22 and the inlet oil path hole 25 are arranged next to each other with the air suction preventive rib 45*a* interposed therebetween, the region that must be covered by the oil strainer 3 is reduced, which leads to an increased degree of freedom in determining the shape of the oil strainer 3.

Oil flow guiding Function

The guide portion 45*b* is formed as an integral part of the lower-stage valve body 45, so that the direction of flow of the oil discharged from the drain port 20 of the pressure regulator valve 5 through the drain hole 23 of the lower-stage valve body 45 coincides with the direction (shown by one-dot chain line arrow in FIG. 1) of the oil flowing from the oil strainer 3 toward the inlet oil path 2. With this arrangement, the drain oil from the pressure regulator valve 5 smoothly flows toward the inlet oil path 2, as indicated by a solid arrow line in FIG. 1.

Accordingly, no collision of flows occurs between the oil flowing from the oil strainer 3 toward the inlet oil path 2, and the drain oil discharged from the pressure regulator valve 5, and thus the resistance of the oil sucked into the oil pump 1 is reduced, assuring an improved efficiency with which the oil is sucked into the oil pump 1.

While the hydraulic control device of the illustrated embodiment employs a three-stage valve body structure, the present invention may be applied to other hydraulic control device provided it includes a valve body structure having at least two stages or layers.

What is claimed is:

1. A hydraulic control device of an automatic transmission, comprising:

an oil pump having an inlet port;

an oil strainer which removes foreign matters contained in oil that is introduced through an opening thereof and directed toward the inlet port of said oil pump through an inlet oil path;

a valve body provided with a plurality of valves for controlling a hydraulic pressure of the automatic transmission; and a pressure regulator valve which regulates a pressure of oil delivered from said oil pump into a line pressure, said pressure regulating valve having a drain port which communicates with a portion of the inlet oil path which is located downstream of said oil strainer, wherein said valve body comprises a plurality of valve bodies that are superposed on and fixed to each other, and at least one partition plate interposed between adjacent ones of said plurality of valve bodies, wherein said pressure regulator valve is provided in one of said plurality of valve bodies other than a lowest-stage valve body, and wherein said drain port of said pressure regulator valve communicates with the inlet oil path leading to said inlet port, through a drain hole formed through said at least one partition plate, and a drain hole formed through the lowest-stage valve body.

2. A hydraulic control device according to claim 1, wherein said drain port of said pressure regulator valve is formed in an outer peripheral portion of said one of said plurality of valve bodies in which the pressure regulator valve is mounted, so that the drain port is located at a position adjacent to the inlet oil path leading to said oil pump.

3. A hydraulic control device according to claim 2, wherein said at least one partition plate includes a drain hole and an inlet oil path hole which are formed adjacent to each other to communicate with said drain port and said inlet oil path that are located adjacent to each other, said lowest-stage valve body being provided with an air suction preventive rib that is located between the drain hole and the inlet oil path hole.

4. A hydraulic control device according to claim 1, wherein said lowest-stage body is provided with a guide member so that a first direction of flow of oil discharged from said drain port or said pressure regulator valve through said drain hole of the lowest-stage valve body coincedes with a second direction of oil flowing from said oil strainer toward the inlet oil path.

* * * * *